United States Patent
Mirakyan et al.

(10) Patent No.: US 9,617,458 B2
(45) Date of Patent: Apr. 11, 2017

(54) PARYLENE COATED CHEMICAL ENTITIES FOR DOWNHOLE TREATMENT APPLICATIONS

(71) Applicant: Schlumberger Technology Corporation, Sugar Land, TX (US)

(72) Inventors: Andrey Mirakyan, Katy, TX (US); Richard Hutchins, Sugar Land, TX (US); Sergey Makarychev-Mikhailov, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 283 days.

(21) Appl. No.: 14/068,593

(22) Filed: Oct. 31, 2013

(65) Prior Publication Data

US 2015/0114648 A1    Apr. 30, 2015

(51) Int. Cl.
| | |
|---|---|
| C09K 8/80 | (2006.01) |
| E21B 43/25 | (2006.01) |
| C09K 8/03 | (2006.01) |
| C09K 8/68 | (2006.01) |
| C09K 8/70 | (2006.01) |
| C09K 8/72 | (2006.01) |
| C09K 8/92 | (2006.01) |

(52) U.S. Cl.
CPC ............... *C09K 8/03* (2013.01); *C09K 8/68* (2013.01); *C09K 8/685* (2013.01); *C09K 8/70* (2013.01); *C09K 8/706* (2013.01); *C09K 8/725* (2013.01); *C09K 8/92* (2013.01); *C09K 2208/26* (2013.01)

(58) Field of Classification Search
None
See application file for complete search history.

(56) References Cited

U.S. PATENT DOCUMENTS

| | | |
|---|---|---|
| 2,863,832 A | 12/1958 | Perrine |
| 2,910,436 A | 10/1959 | Irving et al. |
| 3,215,199 A | 11/1965 | Dilgren |
| 3,251,415 A | 5/1966 | Bombardieri et al. |
| 3,297,090 A | 1/1967 | Dilgren |
| 3,307,630 A | 3/1967 | Dilgren et al. |
| 3,441,085 A | 4/1969 | Gidley |
| 3,451,818 A | 6/1969 | Wareham |
| 3,692,676 A | 9/1972 | Culter et al. |
| 4,250,044 A | 2/1981 | Hinkel |

(Continued)

FOREIGN PATENT DOCUMENTS

| | | |
|---|---|---|
| WO | 9002546 A1 | 3/1990 |
| WO | 9002604 A1 | 3/1990 |

OTHER PUBLICATIONS

Economides, et al., "Section 19.3: Chemical Diverter Techniques", Reservoir Stimulation, John Wiley & Sons, Inc., 3rd Edition, 2000, pp. 19-4 through 19-10.

(Continued)

*Primary Examiner* — John J Figueroa
(74) *Attorney, Agent, or Firm* — Andrea E. Tran

(57) ABSTRACT

Fluids including a parylene-coated chemical entity and methods of treating a subterranean formation with such fluids are disclosed. The methods may include introducing a treatment fluid into a subterranean formation, the treatment fluid containing a parylene-coated particle having a chemical entity encapsulated therein.

12 Claims, 1 Drawing Sheet

(56) References Cited

U.S. PATENT DOCUMENTS

| | | |
|---|---|---|
| 4,862,967 A | 9/1989 | Harris |
| 4,969,526 A | 11/1990 | Cawiezel |
| 5,250,344 A | 10/1993 | Williamson et al. |
| 5,288,504 A | 2/1994 | Versic |
| 5,393,533 A | 2/1995 | Versic |
| 5,551,516 A | 9/1996 | Norman et al. |
| 6,239,183 B1 | 5/2001 | Farmer et al. |
| 6,482,866 B1 | 11/2002 | Dahayanake et al. |
| 6,498,988 B1 | 12/2002 | Robert et al. |
| 6,506,710 B1 | 1/2003 | Hoey et al. |
| 6,703,352 B2 | 3/2004 | Dahayanake et al. |
| 6,776,235 B1 | 8/2004 | England |
| 6,924,254 B2 | 8/2005 | Todd |
| 7,159,658 B2 | 1/2007 | Frost et al. |
| 7,303,018 B2 | 12/2007 | Cawiezel et al. |
| 7,337,839 B2 | 3/2008 | Ayoub et al. |
| 7,451,812 B2 | 11/2008 | Cooper et al. |
| 7,456,212 B2 | 11/2008 | Van Den Berg et al. |
| 7,581,590 B2 | 9/2009 | Lesko et al. |
| 7,678,745 B2 | 3/2010 | Parris et al. |
| 7,798,224 B2 | 9/2010 | Huang et al. |
| 7,888,297 B2 | 2/2011 | Hanes et al. |
| 7,915,336 B2 | 3/2011 | Varnhorn et al. |
| 8,066,068 B2 | 11/2011 | Lesko et al. |
| 8,141,637 B2 | 3/2012 | Barmatov et al. |
| 2007/0142547 A1 | 6/2007 | Vaidya et al. |
| 2007/0181302 A1* | 8/2007 | Bicerano .................. C09K 8/68 166/280.2 |
| 2007/0227741 A1 | 10/2007 | Lovell et al. |
| 2009/0142227 A1 | 6/2009 | Fuchs et al. |
| 2010/0167965 A1 | 7/2010 | Sebastian et al. |
| 2012/0138294 A1 | 6/2012 | Sullivan et al. |
| 2012/0325473 A1* | 12/2012 | Bicerano .............. B01J 31/0211 166/280.2 |
| 2013/0189447 A1 | 7/2013 | Braune et al. |
| 2013/0228334 A1 | 9/2013 | Jiang et al. |

OTHER PUBLICATIONS

Kirk, et al., "Encyclopedia of Chemical Technology", Third Edition, Wiley-Interscience, vol. 16, 1981, pp. 248-276.

Mark, et al., "Oilfield Applications", Encyclopedia of Polymer Science and Engineering, vol. 10, John Wiley & Sons, Inc., 1987, pp. 328-366.

International Search Report and Written Opinion issued in PCT/US2014/059241 on Jan. 19, 2015; 9 pages.

* cited by examiner

PARYLENE COATED CHEMICAL ENTITIES FOR DOWNHOLE TREATMENT APPLICATIONS

BACKGROUND

Hydrocarbons (oil, natural gas, etc.) may be obtained from a subterranean geologic formation (a "reservoir") by drilling a well that penetrates the hydrocarbon-bearing formation. Well treatment methods often are used to increase hydrocarbon production by using a treatment fluid, which includes one or more active chemicals to modify a subterranean formation in a manner that ultimately increases oil or gas flow from the formation to the wellbore for removal to the surface.

For most well treatment methods there may be predetermined locations or specific zones of interest within various subterranean formations that are targeted for a specific treatment action. However, the active chemicals used in such well treatment methods may react and ultimately be spent before reaching the desired reaction site, particularly if such active chemicals are highly reactive and/or responsive to one or more of the other components in the treatment fluids or the subterranean formation itself. In such situations, temporarily storing and/or chemically isolating one or more of the active chemicals in a high capacity carrier until the chemical is to be reacted at the predetermined treatment location or target treatment zone can minimize the inefficiencies associated with treatment of formations or zones that are not of interest.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates to a fluid for treating a subterranean formation, where the fluid includes a solvent and a composition containing a parylene-coated particle including a chemical entity. Methods for treating a subterranean formation with such a fluid are also described.

In some embodiments, the present disclosure relates to a fluid for treating a subterranean formation, where the fluid includes a solvent, a crosslinkable component, and a crosslinking composition including a crosslinker-containing parylene-coated particle. Methods for treating a subterranean formation with such a fluid are also described.

In some embodiments, the present disclosure relates to a fluid for treating a subterranean formation, where the fluid includes a solvent and breaker-containing parylene-coated particle. Methods for treating a subterranean formation with such a fluid are also described.

BRIEF DESCRIPTION OF THE DRAWINGS

The manner in which the objectives of the present disclosure and other desirable characteristics may be obtained is explained in the following description and attached drawings in which.

DETAILED DESCRIPTION

Figure 1:
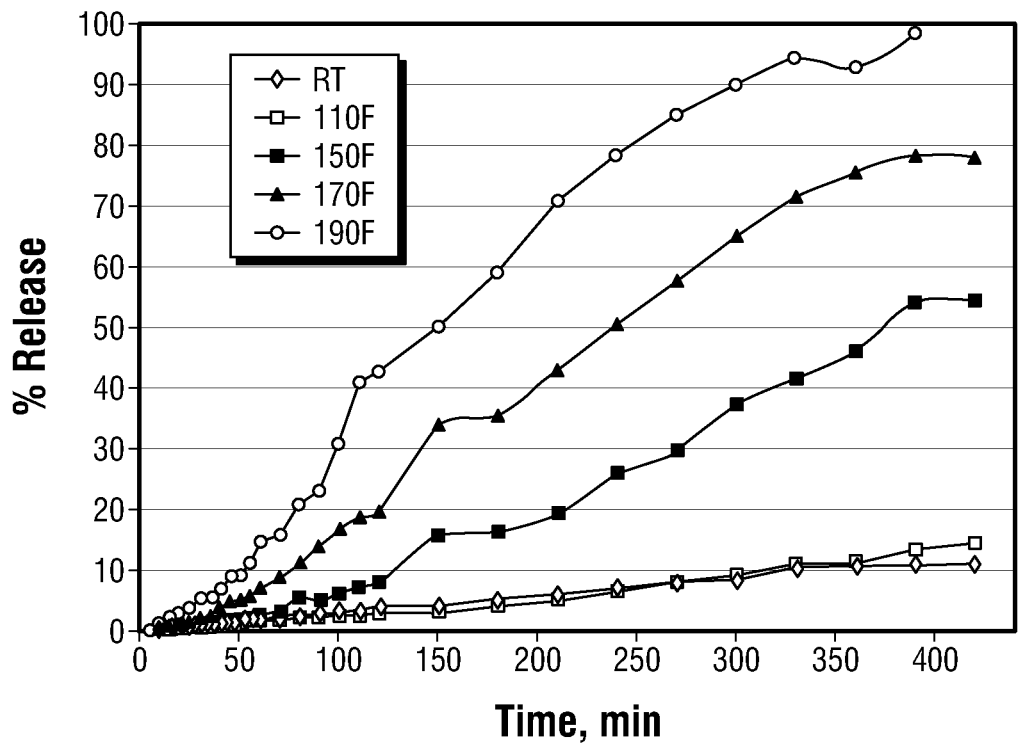
FIG. 1 is an illustration of the release profile of a parylene-coated sodium hydroxide particle at various temperatures.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The methods of the present disclosure relate to introducing treatment fluids, such as treatment fluids comprising a parylene coated chemical entity, such as parylene coated crosslinkers, parylene coated breakers, parylene coated acids, parylene coated bases and/or other atoms or molecules coated with a parylene composition, into a subterranean formation. Such treatment fluids may be introduced during methods that may be applied at any time in the life cycle of a reservoir, field or oilfield; for example, the methods and treatment fluids of the present disclosure may be employed in any desired downhole application (such as, for example, stimulation) at any time in the life cycle of a reservoir, field or oilfield.

As used herein, the term "treatment fluid," refers to any fluid used in a subterranean operation in conjunction with a desired function and/or for a desired purpose. The term "treatment," or "treating," does not imply any particular action by the fluid. For example, a treatment fluid (such as a treatment fluid comprising a chemical entity coated with a parylene composition) introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid. The methods of the present disclosure in which a chemical entity coated with a parylene composition, and treatment fluids comprising a chemical entity coated with a parylene composition, may be used in full-scale operations, pills, or any combination thereof. As used herein, a "pill" is a type of relatively small volume of specially prepared treatment fluid, such as a treatment fluid comprising a chemical entity coated with a parylene composition, to be placed or circulated in the wellbore.

As used herein, the term "treating temperature," refers to the temperature of the treatment fluid that is observed while the treatment fluid is performing its desired function and/or desired purpose.

The term "fracturing" refers to the process and methods of breaking down a geological formation and creating a fracture, such as the rock formation around a wellbore, by pumping fluid at very high pressures (pressure above the determined closure pressure of the formation), in order to increase production rates from or injection rates into a hydrocarbon reservoir. The fracturing methods of the present disclosure may include a chemical entity coated with a parylene composition in one or more of the treatment fluids, but otherwise use conventional techniques known in the art.

In embodiments, the treatment fluids of the present disclosure may be introduced into a wellbore. A "wellbore" may be any type of well, including, but not limited to, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component. Wellbores (multilateral wells) may also include one conduit at the surface and multiple legs at different angles or azimuths (laterals).

The term "field" includes land-based (surface and sub-surface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

The term "parylene" refers to a polymer belonging to the group of polymers based on p-xylylene (substituted or unsubstituted). In embodiments, parylenes may have the repeating structure $-(p\text{-}CH_2-C_6H_4-CH_2)_n-$, where n is an integer, such as an integer in the range of from about 2500 to about 5000, or an integer in the range of from about 4000 to about 4900. Suitable parylene polymers include poly(2-chloro-paraxylylene) ("parylene C"), poly(paraxylylene) ("parylene N"), and poly(2,5-dichloro-paraxylylene) ("parylene D") and poly(difluoro-p-xylylene) ("paralene HT"). Mono-, di-, tri-, and tetra-halo substituted polyparaxylylenes may also be used, such as mono-, di-, tri-, or tetra-chloro substituted polyparaxylylene, mono-, di-, tri-, or tetra-fluoro substituted polyparaxylylene. Other parylene derivatives may also be used including poly(dimethoxy-p-xylylene), poly(sulfo-p-xylylene), poly(iodo-p-xylylene), poly(trifluoro-p-xylylene), poly(difluoro-p-xylylene), and poly(fluoro-p-xylylene).

In embodiments, the parylene (which coats the chemical entity) may be substituted with one or more functional groups. The one or more functional groups may replace any of the hydrogens in the parylene, for example, one or more functional groups may replace any of the hydrogens in the aromatic ring of the parylene, or any of the hydrogens in the repeating structure $-(p\text{-}CH_2-C_6H_4-CH_2)_n-$, provided that the parylene compound having these functional groups is capable of forming a parylene-coated particle that is stable (thermally and chemically) in the presence of an effective amount of the chemical entity (such as, for example, a crosslinker, a breaker, acid, base, or an acidizing agent) and in the intended downhole environment (for example, the surrounding chemicals and the phase thereof, including pH, ionic strength, temperature, pressure, etc.,) until the desired predetermined release time of the chemical entity such that it can perform the desired function and/or purpose.

The term "chemical entity" refers, for example, to one or more atoms, molecules, and/or ions that may be used in a subterranean operation in conjunction with carrying out desired application and/or for achieving a desired function. For example, chemical entities may include crosslinkers, breakers, acids, bases and/or other chemicals.

In embodiments, a chemical entity, for example, a chemical entity in particle form, may be coated with one or more layers, where at least one of the layers is formed from a parylene composition. In some embodiments, the layer in contact with the surface of the chemical entity particle is formed from a parylene composition. As used herein, a chemical entity (such as in particle form) having a parylene composition coated thereon (for example, such that the chemical entity (or chemical entity particle) is encapsulated within the parylene composition) may be referred to interchangeably as either a "parylene-coated chemical entity" or a "parylene-coated particle," unless specified otherwise. In embodiments, a parylene-coated chemical entity may comprise a chemical entity core and a parylene coating, such as a conformal coating that is in contact (such as immediate contact) with the core outer surface. In some embodiments, the chemical entity may be coated in such a manner that the chemical entity can be released from the parylene coated particle.

In embodiments, a parylene coating may be formed, such as on the surface of chemical entity substrate, such as substrate that is a chemical entity core, from a gaseous parylene monomer without an intermediate liquid stage by known methods, such as those described in U.S. Patent Application Publication Nos. 2013/0189447 and 2009/0142227, and U.S. Pat. Nos. 5,288,504; 5,393,533; and 5,250,344, the disclosures of which are hereby incorporated by reference in their entireties. Briefly, a parylene coating may be applied at ambient temperature with vacuum deposition equipment. The film may grow over time as parylene polymer deposition occurs at a molecular level. In some embodiments, a parylene coating may be applied in a room temperature vacuum chamber via a vapor deposition polymerization (VDP) process. Substrates, such as chemical entity cores, to be coated may be placed into a coating chamber. A solid, granular dimer raw material (of any of the above-mentioned parylenes) may be heated under vacuum and vaporized into a dimeric gas. For example, in some embodiments, vaporization of the parylene raw material may be conducted at about 150° C. and about 1.0 torr. The gas may then be pyrolized (such as at a temperature of at about 680° C. and about 0.5 torr) to cleave the dimer to its monomeric form. The monomer gas may be deposited on a substrate, such as chemical entity cores, as a polymer film (a parylene coating) in a deposition chamber at ambient temperature. The parylene coating on the chemical entity core may be as thin or thick as desired based on an intended application. In some embodiments, the thickness may range from hundreds of angstroms to several millimeters. In some embodiments, the thickness of the parylene layer of the parylene-coated particle may be selected depending on the desired release time for the particular chemical entity being encapsulated and the environment that the parylene-coated particle will be exposed to during its intended application. In some embodiments, the thickness may be in a range of from about 1% to about 40% of the largest diameter of the core of the particle, or 5% to about 20% of the largest diameter of the core of the particle, or in a range of from about 1 nm to about 1000 nm, or a thickness in a range of from about 10 nm to about 500 nm, or a thickness in a range of from about 20 nm to about 100 nm.

In embodiments, the parylene-coated particles, which comprise a chemical entity, act as a vehicle that temporarily stores and/or chemically isolates the chemical entity while it is being transported to the target treatment zone or target subterranean formation, where it may diffuse and/or be released from the parylene-coated particle, such as after a predetermined period of time or after exposure to a predetermined downhole condition (such as, for example, temperature or pressure) or predetermined downhole environment (such as for example, the surrounding chemicals and the phase thereof, including pH, ionic strength, temperature, pressure, etc.). After the chemical entity diffuses and/or is released from the parylene-coated particle it is then available for its intended function and/or application, for example, as a crosslinker, a breaker, or an acidizing agent.

As discussed in the embodiments below, the temporary storage and/or chemical isolation of the chemical entity in the parylene-coated particle prevents the premature reaction and/or use of the chemical entity for a predetermined period of time, such as before reaching the target treatment zone or target subterranean formation, and/or before the parylene-coated particle is exposed to a predetermined downhole condition (such as, for example, temperature or pressure) or predetermined downhole environment (such as for example, the surrounding chemicals and the phase thereof, including pH, ionic strength, temperature, pressure, etc.), which may result in the chemical entity diffusing from or exiting the parylene-coated particle at an increased or decreased rate. Premature release of the chemical entity from the parylene-coated particle may result in premature use and/or reaction of the chemical entity, such as a reaction with the subterranean formation itself, a reaction with components in the bulk of the treatment fluid and/or a reaction with other downhole components.

In some embodiments, most of the chemical entity present in the parylene-coated particle arrives at the target treatment zone or target subterranean formation before reacting, for example, at least 95% by weight of the chemical entity initially present in the parylene-coated particle, or at least 99% by weight of the chemical entity initially present in the parylene-coated particle, or at least 99.9% by weight of the chemical entity initially present within the parylene-coated particle, may arrive at the target treatment zone or target subterranean formation before leaving the parylene-coated particle (for example, by diffusion and/or some other form of release from the parylene-coated particle), and reacting with a component present downhole In embodiments, the parylene-coated particles used in the methods of the present disclosure may temporarily store and/or chemically isolate a substantial amount of the chemical entity initially present in the treatment fluid, such as at least 90% by weight of the chemical entity initially present within the treatment fluid, or at least 95% by weight of the chemical entity initially present within the treatment fluid, or at least 99.9% by weight of the chemical entity initially present within the treatment fluid. For example, the chemical entity may be initially stored in the parylene-coated particles, while its concentration in the treatment fluid is effectively zero.

For example, where chemical entity coated by the parylene is a base, such as sodium hydroxide (NaOH), the pH of the treatment fluid will increase as the base diffuses from and/or is released from the parylene-coated particle. In such embodiments, the parylene-coated particle, such as a parylene-coated chemical entity with a strong base core, like sodium hydroxide, may be distributed in a further polymeric material, and/or coated with an additional coating material, such as an additional polymeric material, to form a composite parylene-coated particle. In embodiments, the additional coating material may be a polymeric material known to be stable to exposure to strong bases, and may be a material such as a gel and/or inter-polymer complex (IPC) comprising polyacrylamide (greater than 1%) crosslinked by a non-metallic crosslinker, as described in U.S. Patent Application Publication No. 2012/0138294, the disclosure of which is hereby incorporated by reference in its entirety. In such embodiments, the parylene-coated particle, which encapsulates a base (such as NaOH) may be present in the treatment fluid in a sufficient amount to result in a treatment fluid pH (in the treatment zone of interest) that is sufficient to perform the desired function and/or for a desired purpose of the treatment fluid (such as those described above and below).

The target treatment zone or subterranean formation of interest will be readily apparent to those skilled in the art and may depend on the selected downhole application, and the identity of the chemical entity, which may be, for example, a crosslinker, a breaker, or an acidizing agent.

In embodiments, the parylene-coated particle, such as a parylene-coated chemical entity having a chemical entity core, may be stable (for example, less than 15% by mass deterioration, decomposition or chemical entity release, or less than 5% by mass deterioration, decomposition or chemical entity release) in air, aqueous and/or organic solvents, and/or downhole conditions (such as, for example, temperature or pressure) or downhole environment (such as for example, the surrounding chemicals and the phase thereof, including pH, ionic strength, temperature, pressure, etc.), for periods greater than 10 years, such as periods from about 5 minutes to 1 year, such as from about 10 minutes to about 6 months.

In some embodiments, the chemical entity may be a molecule containing at least one functional group that is complementary to the parylene-coated particle having one or more functional group substituted thereon. Such complementary functional groups may have a high affinity via noncovalent interactions for the one or more functional groups added to the parylene coating the chemical entity. This ability to functionalize the parylene is useful because it may allow for the tuning of the parylene-coated particle to achieve the desired diffusion/release rates of the chemical entity from the parylene-coated particle.

Functional groups that may be added to the parylene and/or the chemical entity include, for example, halogens, alcohols, ethers, ketones, carboxylic acids, esters, carbonates, amines, amides, imines, ureas, aldehydes, isocyanates, tosylates, alkanes, alkenes, alkynes, or combinations thereof.

In embodiments, the parylene-coated particle may possess a thermal stability range (in which it will not decompose, or less than 15% by mass deterioration, decomposition, or release of the chemical entity, such as less than 5% by mass deterioration, decomposition, or release of the chemical entity) of at least 10° C. higher than the highest temperature that is observed in the subterranean formation being treated, such as a thermal stability range of at least up to 200° C., or a thermal stability range of greater than about 60° C. to about 200° C., or a thermal stability range of greater than from about 80° C. to about 190° C., or a thermal stability range of greater than from about 100° C. to about 180° C.

In embodiments, the parylene-coated particles may be selected to have chemical (and thermal) stability (in which it will not decompose, or less than 15% by mass deterioration, decomposition, or chemical entity release, such as less than 5% by mass deterioration, decomposition, or chemical entity release) that is sufficient to survive downhole chemical environments for periods greater than 24 hours, such as periods greater than 2 hours, or greater than 10 minutes.

In embodiments, the parylene-coated particles may comprise a pressure stability range of at least 100 psi higher than the highest pressure that is observed in the subterranean formation being treated, such as a pressure stability range of greater than about 3,000 psi to about 25,000 psi, or a pressure stability range of greater than from about 4,000 psi to about 6,000 psi.

In embodiments, the parylene-coated particles comprise a pH stability range of from about 1 to about 14, or a pH stability range of from about 3 to about 13, or a pH stability range of from about 7 to about 12. The parylene-coated particles may be stable (for example, less than 15% by mass deterioration, decomposition, or chemical entity release, or less than 5% by mass deterioration, decomposition, or chemical entity release) at pH values in a range of from about 8 to about 12 for periods greater than 8 hours, such as periods greater than about 1 hour, or greater than 10 minutes.

In embodiments, the chemical entity may be present in the parylene-coated particles (or composite parylene-coated particles, which may be coated with an additional polymer or inter-polymer complex) at a weight percent of from about 95% to about 50% relative to the weight of the parylene-coated particles, or about 93% or about 90%, or about 85% to about 70% relative to the weight of the parylene-coated particles.

In embodiments, the an amount of parylene in the parylene-coated particle may be in the range of from about 1% to about 50% by weight of the total weight of the parylene-coated particle, such as in the range of from about 2% to about 30% by weight of the total weight of the parylene-coated particle, or in the range of from about 5% to about 15% by weight of the total weight of the parylene-coated particle. In some embodiments, the amount of parylene may be uniformly dispersed over (and/or on the surface of) the chemical entity core such that coating of parylene having a uniform thickness is present on the chemical entity core.

In some embodiments, the parylene coating may be continuous and substantially uniform on the surface of the chemical entity core. In some embodiments, a parylene coating surrounding the chemical entity core in a controlled thickness down to at least about several thousand angstroms may be achieved by known methods. In some embodiments, a parylene coating surrounding the chemical entity core in a controlled thickness up to at least about several millimeters may also be achieved by known methods. In embodiments, the thickness of the parylene coating surrounding the chemical entity core may be controlled to be from about plus or minus 5%, such as plus or minus 2%, or plus or minus 1% of the desired thickness. The parylene coating may be conformal with respect to surfaces, edges and crevices of a chemical entity core and may be substantially pinhole-free, such as, for example, less than 5 pinholes, pores or gaps greater than about 50 nanometers in diameter per micron$^2$ of chemical entity core surface area, or less than 2 pinholes, pores or gaps greater than about 40 nanometers in diameter per micron$^2$ of chemical entity core surface area.

In embodiments, the parylene-coated particles containing the chemical entity may release the chemical entity after a predetermined duration and/or after exposure to predetermined conditions, such as downhole conditions and/or down hole environments, at least to the extent that an effective amount of the chemical entity may be released downhole for the desired downhole application, such as, for example, as a crosslinker, a breaker, an acidizing agent (or acid), or base.

The parylene-coated particles of the present disclosure may be used for temporarily storing the chemical entity for a predetermined amount of time, for example, while the chemical entity is being transported downhole with the treatment fluid. In embodiments, the chemical entity and parylene (for example, the thickness of the coating applied to the chemical entity core may be adjusted) may be selected such that the chemical entity may be temporarily stored (such as minutes, hours, days or months), for example, from about 10 to about 1440 minutes, such as from about 10 to about 720 minutes, or 10 to about 480 minutes, or from about 10 to about 60 minutes) in the parylene-coated particle for a predetermined time after coating the chemical entity with parylene. Subsequently, after the predetermined amount of time has passed, the chemical entity may be released from the chemical-entity-containing parylene-coated particles into the bulk of the treatment fluid, such as, for example, to act in its intended capacity as a crosslinker, a breaker, or an acidizing agent.

In some embodiments, the parylene-coated particles may be exposed to a predetermined downhole condition (such as a temperature, pressure, pH, treatment fluid component concentration, or combination thereof) to initiate the release (and/or increase the rate at which the chemical entity is released) of the chemical entity from the parylene-coated particles into the bulk of the treatment fluid, such as, for example, to act in its intended capacity as a crosslinker, a breaker, or an acidizing agent. For example, in embodiments, the release mechanism of the chemical entity from the parylene-coated particles may be controlled through an outward diffusion process across the parylene network into the bulk of the fluid, driven by a chemical potential difference between the bulk of the fluid and the interior of the parylene-coated particle. In some embodiments, the diffusion process may be accelerated by exposure of the parylene-coated particles to elevated temperatures.

The driving force of the release (outward diffusion) of the chemical entity from the parylene-coated particles may depend on a number of factors. For example, in some embodiments, driving force of the release (outward diffusion) may be thermal, coupled by media pH, parylene coating (hydration rate) thickness and so on. Each type of chemical entity may have a distinguished set of threshold conditions for the release event to take place. For example, for parylene-coated particles in which the coated chemical entity is a base, the main driving force of the release (modulation of the release rate) may involve the characteristics of the parylene (and any other layers that the parylene-coated particle comprises).

In some embodiments, parylene-coated particles may be selected such that after the parylene-coated particles have been exposed to a predetermined downhole condition or downhole environment, such as a temperature, pressure, pH, treatment fluid component concentration, or combination thereof, the chemical entity may be released from the parylene-coated particles into the bulk of the treatment fluid. Diffusion (such as, for example, after a solvent, such as water, has permeated the particle and at least some core material (the encapsulated chemical entity), which then may diffuse out of the particle in a solubilized form) and/or under some circumstances decomposition of the parylene-coated particles, such as thermal decomposition and/or chemical decomposition, may be used to release the chemical entity into the bulk of the treatment fluid, such as, for example, to act in its intended capacity.

The concentration of the chemical entity (alone, not counting the weight of the parylene) in the treatment fluid may be varied depending on the identity of the chemical entity and its intended function.

In embodiments, the parylene-coated particles, such as parylene-coated particles in which the chemical entity is a strong base or strong acid, may be distributed in a further polymeric material, and/or coated in a further polymeric material, to form a composite parylene-coated particle, such as a composite parylene-coated particle, which may be incorporated into a treatment fluid and pumped into a subterranean formation. In embodiments, composite parylene-coated particles may further delay the diffusion of the chemical entity from the parylene-coated particle to the bulk of the treatment fluid. Because the chemical entity will diffuse out of the parylene-coated particles and then out of the further polymeric material, the amount of further delay can be increased by increasing the size of the additional polymer layer that coats the parylene-coated particle. The size of the parylene-coated particles will depend on the specific application for which the parylene-coated particles and/or parylene-coated particles is intended.

In embodiments, the parylene-coated particle, such as a parylene-coated particle comprising a strong base, like sodium hydroxide, may be distributed in an additional polymeric material, and/or coated in an additional polymeric material, to form a composite parylene-coated particle. In embodiments, composite parylene-coated particles may further delay the diffusion of the chemical entity from the parylene-coated particle to the bulk of the treatment fluid. Because the chemical entity will diffuse out of the parylene-coated particle and then out of the additional polymeric material, the amount of further delay can be increased by increasing the size of the additional polymer material into which the parylene-coated particle is dispersed and/or by increasing the thickness of the layer of additional polymeric material coated on individual parylene-coated particles. The effective amount of parylene-coated particle distributed in the additional polymeric material will depend on the specific application for which the composite parylene-coated particle is intended.

In embodiments, the additional polymeric material of the composite parylene-coated particle may be a polymer material that is known to be stable to exposure to strong bases, and may be a material such as a gel and/or inter-polymer complex (IPC) comprising polyacrylamide (greater than 1%) crosslinked by a non-metallic crosslinker, as described in U.S. Patent Application Publication No. 2012/0138294, the disclosure of which is hereby incorporated by reference in its entirety.

As used herein, the term "gel" refers to a solid or semi-solid, jelly-like composition that can have properties ranging from soft and weak to hard and tough. The term "gel" may also refer to a substantially dilute crosslinked system, which exhibits no flow when in the steady-state, which by weight is mostly liquid, yet behaves like solids due to a three-dimensional crosslinked network within the liquid. The crosslinks within the fluid may give a gel its structure (hardness) and contribute to stickiness. Accordingly, gels are a dispersion of molecules of a liquid within a solid in which the solid is the continuous phase and the liquid is the discontinuous phase. In an embodiment, a gel is considered to be present when the Elastic Modulus G' is larger than the Viscous Modulus G", when measured using an oscillatory shear rheometer (such as a Bohlin CVO 50) at a frequency of 1 Hz and at 20° C. The measurement of these moduli is well known to one of minimal skill in the art, and is described in An Introduction to Rheology, by H. A. Barnes, J. F. Hutton, and K. Walters, Elsevier, Amsterdam (1997), the disclosure of which is hereby incorporated by reference in its entirety.

As discussed in U.S. Patent Application Publication No. 2012/0138294, the term polyacrylamide refers to pure polyacrylamide homopolymer or copolymer with near zero amount of acrylate groups, a partially hydrolyzed polyacrylamide (PHPA) polymer or copolymer with a mixture of acrylate groups and acrylamide groups formed by hydrolysis and copolymers comprising acrylamide, acrylic acid, and/or other monomers. Hydrolysis of acrylamide to acrylic acid proceeds with elevated temperatures and is enhanced by acidic or basic conditions. The reaction product is ammonia, which will increase the pH of acidic or neutral solutions. Except for severe conditions, hydrolysis of polyacrylamide tends to stop near 66%, representing the point where each acrylamide is sandwiched between two acrylate groups and steric hindrance restricts further hydrolysis. Polyacrylic acid is formed from acrylate monomer and is equivalent to 100% hydrolyzed polyacrylamide.

In embodiments, the polyacrylamide may have a weight average molecular weight of greater than or equal to about 0.5 million g/mol, or the polyacrylamide may have a weight average molecular weight of from about 1 million to about 20 million g/mol. The polyacrylamide may be a partially hydrolyzed polyacrylamide having a degree of hydrolysis of from 0 or 0.01% up to less than or equal to about 40%, or from 0 or 0.05% up to less than or equal to about 20%, or from 0 or 0.1% up to less than or equal to about 50%.

The gel in which the parylene-coated particle are dispersed may also comprise polyacrylamide crosslinked with a non-metallic crosslinker wherein the polyacrylamide is present in the gel at a concentration of greater than or equal to about 1 wt %, or greater than or equal to about 2 wt % and less than or equal to about 10 wt %, based on the total weight of the gel. In embodiments, such a gel has a pH of less than or equal to about 3 or greater than or equal to about 9, wherein the gel pH is defined as the pH of a 5% combination of the gel in water.

When the non-metallic crosslinker is a polylactam, such as polyvinylpyrrolidone (PVP), the crosslinking appears to result from a ring-opening event wherein the lactam ring is opened to produce a bond between an acrylamide or acrylate moiety and the lactam moiety to produce the gel. For example, partially hydrolyzed polyacrylamide (PHPA) at 3% and polyvinylpyrrolidone (PVP) at 3-6% forms a very elastic gel when heated.

Such composite parylene-coated particles dispersed and/or coated in a gel and/or inter-polymer complex (IPC) comprising polyacrylamide (greater than 1%) crosslinked by a non-metallic crosslinker, as described in U.S. Patent Application Publication No. 2012/0138294, may be dehydrated to produce a composite parylene-coated particle in which a gel concentrate coats the parylene-coated particle or a composite parylene-coated particle that is a gel concentrate comprising parylene-coated particles dispersed therein. The size of the gel concentrate may be selected to be any desirable size most suitable for the intended application of the composite parylene-coated particle.

In embodiments, dehydrating the parylene-coated particle comprises heating, freeze drying, or otherwise dehydrating the gel to produce the gel concentrate. In an embodiment, the particle size of the composite parylene-coated particle may be reduced to facilitate subsequent rehydration and thus reconstitution of the gel concentration to produce a reconstituted composite parylene-coated particle.

As used herein, the term "dehydrating" as in "dehydrating a gel" refers to removing water or whatever solvent is present in the gel. Dehydrating may be accomplished by the application of heat, freeze, reduced pressure, freeze-drying, or any combination thereof.

As used herein, the term "freeze-drying" refers to the process also known in the art as lyophilisation, lyophilization or cryodesiccation, which is a dehydration process in which the temperature of a material is lowered (for example, freezing the material) and then surrounding pressure is reduced to allow the frozen water in the material to sublimate directly from the solid phase to the gas phase.

In embodiments, the gel of the composite parylene-coated particle, the gel being produced according to U.S. Patent Application Publication No. 2012/0138294, absorbs water when placed in contact with an aqueous solution. In embodiments, the gel of the composite parylene-coated particle in contact with water uptakes greater than or equal to about 100% by weight of water, or greater than or equal to about 200% by weight of water, based on the weight of the gel present.

In embodiments, the gel of the composite parylene-coated particle is formed at a pH of greater than or equal to about 9 and remains as a gel when the pH of the gel is lowered below 9, or when the pH of the gel is lowered below about 7, below about 5, and/or below about 3. Accordingly, in embodiments, the gels of the composite parylene-coated particle are non-reversible once formed, pH stable once formed, or a combination thereof.

Suitable solvents for use with the methods of the present disclosure, such as for preparing the parylene-coated particles of the present disclosure (which may be prepared by any parylene coating technique, such as a vapor deposition process known to those of skill in the art), or for forming the treatment fluids disclosed herein, may be aqueous or organic based. Aqueous solvents may include at least one of fresh water, sea water, brine, mixtures of water and water-soluble organic compounds and mixtures thereof. Organic solvents may include any organic solvent that is able to dissolve or suspend the various components, such as reactants for forming the parylene-coated particles and/or components of the treatment fluid.

Suitable organic solvents may include, for example, alcohols, glycols, esters, ketones, nitrites, amides, amines, cyclic ethers, glycol ethers, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diethylene glycol dimethyl ether, 1,2-dimethoxy-ethane (DME), dimethylether, dibutylether, dimethyl-formamide (DMF), dimethyl sulfoxide (DMSO), dioxane, ethanol, ethyl acetate, ethylene glycol, glycerin, heptanes, hexamethylphosphoramide (HMPA), hexamethylphosphorous triamide (HMPT), hexane, methanol, methyl t-butyl ether (MTBE), methylene chloride, N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N,N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, perchloroethylene, methylene chloride, mixtures thereof.

In some embodiments, a plurality of parylene-coated particles, which may contain the same or different chemical entities, may be present in the treatment fluids of the present disclosure. For example, a plurality of parylene-coated particles in the treatment fluid may comprise two or more parylene-coated chemical entities (a first and a second parylene-coated particle, which may have different parylene coatings and or coating thicknesses) containing the same chemical entity (or different chemical entities), where the first parylene-coated particles are selected (and/or designed) such that they effectively release the chemical entity at a different rate and/or under different conditions than the second parylene-coated particles. For example, a plurality of parylene-coated particles in the treatment fluid may be selected such that the respective chemical entities may be released in multiple stages or at different times after being pumped into the subterranean formation, depending on when the chemical entity is intended to perform its desired function. In embodiments, each of the active chemical components present in a treatment fluid may be present in one or more parylene-coated particles. Such parylene-coated particles may have different chemical entity release kinetics that are selected to release the chemical entity at the time the desired function is to be implemented.

While the methods and treatment fluids of the present disclosure are described herein as comprising the above-mentioned components, it should be understood that the methods and fluids of the present disclosure may optionally comprise other additional materials, such as the materials and additional components discussed below, which relate to various methods and applications using the parylene-coated particles. As discussed in more detail below, after the respective chemical entity diffuses and/or is released from the parylene-coated particle it may perform its intended function and/or application, for example, as a crosslinker, a breaker, or an acidizing agent.

Crosslinker Coated with Parylene

In some embodiments, the chemical entity that is coated with parylene is a crosslinker and the methods of the present disclosure comprise introducing a crosslinkable fluid including a crosslinking composition and one or more crosslinkable components or materials into a subterranean formation. The extent to which this chemical entity may be included in the parylene-coated particle is discussed above.

In embodiments, the treatment fluid of the present disclosure may be a crosslinking fluid and comprise a crosslinking composition and one or more crosslinkable components or materials. Such a treatment fluid may be employed in downhole applications, such as for crosslinking materials in subterranean formations, treating hydrocarbon-bearing rock formations, sealing hydrocarbon-bearing rock formations and/or controlling fluids in hydrocarbon-bearing rock formations to minimize flow of an unacceptable amount of material/fluid (such as water), into a predetermined area, such as into a wellbore, which can be referred to as fluid loss.

As used herein, the phrase "crosslinkable fluid," refers, for example, to a composition comprising a solvent, a crosslinkable material, which includes any crosslinkable compound and/or substance with a crosslinkable moiety, (hereinafter "crosslinkable component") that may be substantially inert to any produced fluids (gases and liquids) and other fluids injected into the wellbore or around the wellbore, such as fracturing fluids, and a crosslinking composition, which comprises a crosslinker (such as a parylene-coated particle comprising a crosslinker), for example, to create a fracture.

The crosslinkable fluid that may be used in such embodiments of the methods of the present disclosure may be a solution initially having a very low viscosity that can be readily pumped or otherwise handled. For example, the viscosity of the crosslinkable fluid may be from about 1 (centiPoise) cP to about 1,000 cP, or be from about 1 cP to about 100 cP at the treating temperature, which may range from a surface temperature to a bottom-hole static (reservoir) temperature (BHST), such as from about −40° C. to about 150° C., or from about 10° C. to about 70° C., or from about 25° C. to about 60° C., or from about 32° C. to about 55° C.

Crosslinking the crosslinkable fluid generally increases its viscosity. As such, having the composition in the uncrosslinked/unviscosified state allows for pumping of a relatively less viscous fluid having relatively low friction pressures within the well tubing, and the crosslinking may be delayed in a controllable manner such that the properties of thickened crosslinked fluid are available at the rock face instead of within the wellbore. Such a transition to a crosslinked/uncrosslinked state may be achieved over a period of minutes or hours or days based on the particular molecular make-up of the a parylene-coated particle comprising a crosslinker, and results in the initial viscosity of the crosslinkable fluid increasing by at least an order of magnitude, such as at least two orders of magnitude, or results in the initial viscosity of the crosslinkable fluid increasing from by at least two orders of magnitude at the treating temperature, for example, from less than about 100 centipoise at 100 $sec^{-1}$ shear rate at the treating temperature to at least about 10000 centipoise at 100 $sec^{-1}$ at the treating temperature.

In embodiments, the core (comprising the crosslinker) of the parylene-coated particle may have any desired diameter. For example, the parylene-coated particles (comprising a core of crosslinker) of the methods of present disclosure may be parylene-coated particles that contain an average core size that falls in a range of from about 1 micron to about 5 mm, such as an average core size that falls in a range of from about 100 microns to about 1000 microns, or an average core size that falls in a range of from about 200 to about 700 microns.

In some embodiments, the core (comprising the crosslinker) of the parylene-coated particle used in the methods of present disclosure may comprise the crosslinker in an amount greater than 95% by weight of the parylene-coated particle, such as more than 93% by weight of the core material, or more than 90% by weight of the parylene-coated particle. In some embodiments, the crosslinker molecules are present in the parylene-coated particle at a weight percent of from about 95% to about 50% relative to the weight of the parylene-coated particle, or about 93% or about 90%, or about 85% to about 70% relative to the weight of the parylene-coated particle.

Any crosslinker or crosslinking agent that can be released from the parylene-coated particles may be used. "Crosslinker" and/or the phrase "crosslinking agent" (hereinafter collectively referred to as a "crosslinker") refer, for example, to a compound or mixture that assists in the formation of a three-dimensional polymerized structure of the crosslinkable component under at least some downhole conditions. Suitable crosslinkers for incorporation into the parylene-coated particles in the methods of the present disclosure are those capable of crosslinking polymer molecules to form a three-dimensional network. Suitable organic crosslinking agents include, but are not limited to, aldehydes, dialdehydes, phenols, substituted phenols, and ethers. Suitable inorganic crosslinking agents include, but are not limited to, polyvalent metals, conventional chelated polyvalent metals, and compounds capable of yielding polyvalent metals. In embodiments, the crosslinkers may be Group 4 (of the periodic table) based crosslinkers, such as the titanates or zirconates, or Group 13 (of the periodic table) based crosslinkers, such as borates or aluminates. For example, such crosslinkers may comprise a chemical compound containing a polyvalent ion such as boron or a metal such as chromium, iron, aluminum, titanium, antimony and zirconium, or mixtures of polyvalent ions. Suitable boron crosslinkers include boric acid, sodium tetraborate, and encapsulated borates. Suitable zirconium crosslinkers include zirconium complexes, such as lactates (for example sodium zirconium lactate), triethanolamines, 2,2'-iminodiethanol, amino acids, and with mixtures of these ligands. Suitable titanates include lactates and triethanolamines, and mixtures thereof. Suitable crosslinkers also include aluminum, iron and/or titanium containing species.

The concentration of the crosslinker (alone, not counting the weight of the parylene) in the crosslinkable fluid may be from about 0.001 wt % to about 10 wt %, such as about 0.005 wt % to about 2 wt %, or about 0.01 wt % to about 1 wt %.

In embodiments, the parylene-coated particles may be present in the crosslinkable fluid, which may comprise a solvent and a crosslinkable material, in an amount of from about 0.2 to about 50 pounds per thousand gallons of the crosslinkable fluid, such as from about 0.5 to about 20 pounds per thousand gallons of the fluid, or from about 1.0 to about 15 pounds per thousand gallons of the fluid.

Suitable solvents for use with the crosslinkable fluid in the present disclosure may be aqueous or organic-based, and include those mentioned above in addition to those mentioned below. Briefly, aqueous solvents may include at least one of fresh water, sea water, brine, mixtures of water and water-soluble organic compounds and mixtures thereof. Organic solvents may include any organic solvent that is able to dissolve or suspend the various components of the crosslinkable fluid, such as any of those identified above and throughout the present disclosure.

In some embodiments, the crosslinkable fluid may initially have a viscosity similar to that of the aqueous solvent, such as water. An initial water-like viscosity may allow the solution to effectively penetrate voids, small pores, and crevices, such as encountered in fine sands, coarse silts, and other formations. In other embodiments, the viscosity may be varied to obtain a desired degree of flow sufficient for decreasing the flow of water through, or increasing the load-bearing capacity of, a formation. The viscosity of the crosslinkable fluid may also be varied by increasing or decreasing the amount of solvent relative to other components, or by other techniques, such as by employing viscosifying agents.

The crosslinkable fluids or compositions suitable for use in the methods of the present disclosure comprise a crosslinkable component. As discussed above, a "crosslinkable component," as the term is used herein, is a compound and/or substance that comprises a crosslinkable moiety. For example, the crosslinkable components may contain one or more crosslinkable moieties, such as a carboxylate and/or a cis-hydroxyl(vicinal hydroxyl)moiety, that is able to coordinate with the reactive sites of known crosslinkers, such as known crosslinkers that may be comprised in the parylene-coated particles of the present disclosure.

The crosslinkable component may be natural or synthetic polymers (or derivatives thereof) that comprise a crosslinkable moiety, for example, substituted galactomannans, guar gums, high-molecular weight polysaccharides composed of mannose and galactose sugars, or guar derivatives, such as hydrophobically modified guars, guar-containing compounds, and synthetic polymers. Suitable crosslinkable components may comprise a guar gum, a locust bean gum, a tara gum, a honey locust gum, a tamarind gum, a karaya gum, an arabic gum, a ghatti gum, a tragacanth gum, a carrageenen, a succinoglycan, a xanthan, a diutan, a hydroxylethylguar hydroxypropyl guar, a carboxymethylhydroxyethyl guar, a carboxymethylhydroxypropylguar, an alkylcarboxyalkyl cellulose, an alkyl cellulose, an alkylhydroxyalkyl cellulose, a carboxyalkyl cellulose, a carboxyalkyl cellulose ether, a hydroxyethylcellulose, a carboxymethylhydroxyethyl cellulose, a carboxymethyl starch, a copolymer of 2-acrylamido-2methyl-propane sulfonic acid and acrylamide, a terpolymer of 2-acrylamido-2methyl-propane sulfonic acid, acrylic acid, acrylamide, or derivative thereof. In embodiments, the crosslinkable components may be present at about 0.01% to about 4.0% by weight based on the total weight of the crosslinkable fluid, such as at about 0.10% to about 2.0% by weight based on the total weight of the crosslinkable fluid.

The term "derivative" herein refers, for example, to compounds that are derived from another compound and maintain the same general structure as the compound from which they are derived.

Upon selection of the appropriate crosslinkable component (for example, in view of factors such as the downhole environment and/or desired application) to be incorporated into the crosslinkable fluid (or treatment fluid), crosslinking may be accomplished through the assistance of a crosslinking composition comprising a parylene-coated particles, such as a parylene-coated particles containing a crosslinker encapsulated by a parylene layer.

For example, when the particular application may include the formation of borate-crosslinked gels, a suitable crosslinkable component may include galactomannan polymers, such as guar and/or substituted guars, which crosslink when (1) the crosslinkable fluid (or treatment fluid) comprises boric acid, and (2) the pH is above about 8, where the borate ion exists and is available to crosslink and cause gelling. The methods of the present disclosure may be used to create such a borate-crosslinked gel in a variety of ways, such as by including one or more parylene-coated particles in the crosslinkable fluid (or treatment fluid). For example, the crosslinkable fluid (or treatment fluid) for forming a borate-crosslinked gel may comprise a parylene-coated particle where the chemical entity encapsulated within the parylene-coated particle may be either boric acid or a pH control agent, such as a base, sodium or potassium hydroxide, magnesium oxide, sodium or potassium silicate, sodium sesquicarbonate, and sodium carbonate, amines (such as hydroxyalkyl amines, anilines, pyridines, pyrimidines, quinolines, and pyrrolidines, and carboxylates such as acetates and oxalates).

In embodiments where the chemical entity within the parylene-coated particle is a base, such as sodium hydroxide, and a boric acid (crosslinker) is in the bulk treatment fluid, the pH of the treatment fluid will increase as the base diffuses from and/or is released from the parylene-coated particle and thus increase the effective concentration of the active crosslinker (the borate anion), which reversibly creates the borate crosslinks between the selected crosslinkable component, such as guar and/or substituted guars.

In some embodiments, delayed crosslinking may be achieved, for example, when the borate-based crosslinker is blended as an additive with the treatment fluid while parylene-coated particles (such as parylene-coated particles comprising NaOH encapsulated by parylene) is co-pumped as the pH adjuster. In such embodiments, the event of crosslinking would begin when sufficient NaOH has been released (from the parylene-coated particles) into the bulk of the fluid and the pH of the fluid is raised above a predetermined known threshold value that is sufficient to initiate crosslinking.

In some embodiments, guar or derivatized guar powder (that has not been subject to hydration) may be pumped into the wellbore along with a parylene-coated particle (such as parylene-coated particles comprising NaOH encapsulated by parylene). In such embodiments, the parylene-coated particles may be selected such that the base (such as NaOH) is released in two stages and/or two different parylene-coated particles may be used that have different base release kinetics. In such embodiments, the guar or derivatized guar powder may be hydrated downhole with the initial first stage release of base, such as NaOH, from a "base loaded" or "base-containing" parylene-coated particle, which would raise the pH to moderate alkaline level sufficient to hydrate the guar or derivatized guar. Subsequently, the full crosslinking of the guar or derivatized guar may be initiated with the full (second stage) release of NaOH from the parylene-coated particles to achieve a strongly alkaline treatment fluid that is able to fully crosslink the crosslinkable component (such as guar) of the treatment fluid.

In such embodiments, the "base-containing" parylene-coated particle may be present in the crosslinkable fluid (or treatment fluid) in a sufficient amount to result in a fluid pH (in the treatment zone of interest) above about 8, where the borate ion exists and is available to crosslink and cause gelling, such as a pH in the range of from about 8 to about 12, or a pH in the range of from about 8 to about 9. At lower pH, the borate functional group is tied up by hydrogen and thus is not available for crosslinking. In embodiments where the parylene-coated particle contains boric acid (coated with parylene), the bulk crosslinkable fluid (or treatment fluid) may be adjusted to a pH above 8 and as the boric acid diffuses from and/or is released from the parylene-coated particle, the borate ion would then be available to crosslink and cause gelling in the bulk crosslinkable fluid (or treatment fluid).

In embodiments, crosslinking may be accomplished in a crosslinkable fluid (or treatment fluid) comprising two or more parylene-coated particles, which optionally may be composite parylene-coated particles, each containing the same or different chemical entities. For example, with respect to the above mentioned borate-crosslinked gel, the treatment fluid may comprise a first parylene-coated particle that contains a pH control agent, such as a base, and a second parylene-coated particle that contains boric acid. In such embodiment, the parylene-coated particle may be selected such that the pH control agent and the boric acid begin to diffuse from the respective parylene-coated particle at any desired time, such as approximately the same time, independent of the other.

In embodiments, as result of the choice of the parylene-coated particle crosslinker system, the rate of crosslinking may be retarded or delayed such that a gelled fluid may be readily pumped into a wellbore for entry into a subterranean formation before substantial crosslinking occurs in the crosslinkable fluid. One of ordinary skill in the art would appreciate that additional additives may be included in the crosslinkable fluid to provide additional delay before substantial crosslinking occurs in the crosslinkable fluid.

In embodiments, once the crosslinkable fluid containing the crosslinker-containing parylene-coated particle is mixed, substantial crosslinking does not occur in the crosslinkable fluid immediately, such as for at least about 30 minutes, or substantial crosslinking does not occur in the crosslinkable fluid for at least about 30 minutes to about 2 days. In some embodiments, substantial crosslinking does not occur in the crosslinkable fluid for at least about two hours, or substantial crosslinking does not occur in the crosslinkable fluid for at least about six hours to about 2 days. In some embodiments, substantial crosslinking does not occur in the crosslinkable fluid for at least about several days. The phrase "substantial crosslinking does not occur" means that at least 80% of the crosslinkable component remains uncrosslinked once the crosslinkable fluid is mixed (either downhole or at the surface), such as at least 95%, or as at least 99% of the crosslinkable component remains uncrosslinked once the crosslinkable fluid is mixed.

The crosslinkable fluid of the present disclosure may be tailored by selecting an appropriate crosslinker-containing parylene-coated particle (such as crosslinker-containing parylene-coated particle where the diffusion of the crosslinker from the parylene-coated particle is delayed) and optionally other additives such that the crosslinking occurs over a desired time interval. For example, the components of the crosslinkable fluid and/or the conditions the crosslinkable fluid is exposed to may be selected such that the crosslinking occurs in less than about 6 hours after release of the crosslinker from the parylene-coated particle, or less than about 2 hours after release of the crosslinker from the parylene-coated particle, or less than about 0.5 hours after release of the crosslinker from the parylene-coated particle.

In embodiments, the parylene-coated particle containing the chemical entity, such as a crosslinker-containing parylene-coated particle, may be stored for a few hours, weeks or even months, such as over six months, before being introduced into a subterranean formation.

Additionally, the components of the crosslinkable fluid and/or the conditions the crosslinkable fluid is exposed to may be selected such that the doubling of the apparent viscosity of the crosslinkable fluid may occur over about 0.5 hours to a few weeks, such as over two hours to several days. The components of the crosslinkable fluid and/or the conditions to which the crosslinkable fluid is exposed may also be selected such that the apparent viscosity increases to about 50 percent of its ultimate value upon mixing of the components and or exposure to the predetermined conditions for about 0.5 hours to several days at room temperature.

While the treatment fluids of the present disclosure are described herein as comprising the above-mentioned components, it should be understood that the crosslinkable fluids of the present disclosure may optionally comprise other chemically different materials, such as other additives and chemicals that are known to be commonly used in oilfield applications by those skilled in the art.

In this regard, the crosslinkable fluid may include components independently selected from any solids, liquids, gases, and combinations thereof, such as slurries, gas-saturated or non-gas-saturated liquids, mixtures of two or more miscible or immiscible liquids, and the like, as long as such additional components allow for the formation of a three-dimensional structure upon substantial completion of the crosslinking reaction. For example, the crosslinkable fluid may comprise organic chemicals, inorganic chemicals, and any combinations thereof, which may be contained within a parylene-coated particle. Organic chemicals may be monomeric, oligomeric, polymeric, crosslinked, and combinations, while polymers may be thermoplastic, thermosetting, moisture setting, elastomeric, and the like. Inorganic chemicals may be metals, alkaline and alkaline earth chemicals, minerals, and the like.

In embodiments, the crosslinkable fluids of the present disclosure may comprise a breaker, which optionally may be contained within a parylene-coated particle (as discussed in more detail below) and released after the crosslinking event has occurred. Breakers that may be used in the methods of the present disclosure are discussed in more detail below.

Embodiments may also include proppant particles in the treatment fluid that are substantially insoluble in the fluids of the treatment formation. Proppant particles carried by the treatment fluid remain in the fracture created, thus propping open the fracture when the fracturing pressure is released and the well is put into production. Suitable proppant materials include sand, walnut shells, sintered bauxite, glass beads, ceramic materials, naturally occurring materials, or similar materials. Mixtures of proppants can be used as well. If sand is used, it may be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (for example, corn cobs or corn kernels); processed wood materials such as those derived from woods such as oak, hickory, walnut, poplar, mahogany, etc. including such woods that have been processed by grinding, chipping, or other form of particulation, processing, etc. Further information on nuts and composition thereof may be found in ENCYCLOPEDIA OF CHEMICAL TECHNOLOGY, Edited by Raymond E. Kirk and Donald F. Othmer, Third Edition, John Wiley & Sons, vol. 16, pp. 248-273, (1981).

The concentration of proppant in the treatment fluid or crosslinkable fluid can be at any concentration known in the art. For example, the concentration of proppant in the fluid may be in the range of from about 0.03 to about 3 kilograms of proppant added per liter of liquid phase. Also, any of the proppant particles can further be coated with a resin to potentially improve the strength, clustering ability, and flow back properties of the proppant.

Furthermore, the crosslinkable fluid may comprise buffers, pH control agents, and various other additives added to promote the stability or the functionality of the fluid. Any of these additional components may be encapsulated within one or more layers of parylene (thereby forming a parylene-coated particle) for introduction into the subterranean formation. The components of the crosslinkable fluid may also be selected such that they may or may not react with the subterranean formation that is to be sealed and/or the other components of the treatment fluid (crosslinkable fluid).

The crosslinkable fluid may be based on an aqueous or non-aqueous solution. The crosslinkable fluid may also comprise a mixture of various other crosslinking agents, and/or other additives, such as fibers or fillers, provided that the other components chosen for the mixture are compatible with the intended use of forming a crosslinked three-dimensional structure that at least increases the viscosity of the fluid. When used in the crosslinkable fluids, the fiber or filler component may be included at concentrations from about 1 to about 15 grams per liter of the liquid phase of the crosslinkable fluid, such as a concentration of fibers or fillers from about 2 to about 12 grams per liter of crosslinkable fluid, or from about 2 to about 10 grams per liter of crosslinkable fluid.

Stabilizing agents can be added to the treatment fluid to slow the degradation of the crosslinked structure after its formation downhole. Suitable stabilizing agents may include buffering agents, such as agents capable of buffering at pH of about 8.0 or greater (such as water-soluble bicarbonate salts, carbonate salts, phosphate salts, or mixtures thereof, among others); and chelating agents (such as ethylenediaminetetraacetic acid (EDTA), nitrilotriacetic acid (NTA), or diethylenetriaminepentaacetic acid (DTPA), hydroxyethyl-ethylenediaminetriacetic acid (HEDTA), or hydroxyethyl-iminodiacetic acid (HEIDA), among others). Buffering agents may be added to the crosslinkable fluid in an amount from about 0.05 wt % to about 10 wt %, and from about 0.1 wt % to about 2 wt %, based upon the total weight of the crosslinkable fluid. Additional chelating agents may be added to the crosslinkable fluid to at least about 0.75 mole per mole of metal ions expected to be encountered in the downhole environment, such as at least about 0.9 mole per mole of metal ions, based upon the total weight of the crosslinkable fluid.

Surfactants can be added to promote dispersion or emulsification of components of the crosslinkable fluid, or to provide foaming of the crosslinked component upon its formation downhole. Suitable surfactants include alkyl polyethylene oxide sulfates, alkyl alkylolamine sulfates, modified ether alcohol sulfate sodium salts, or sodium lauryl sulfate, among others. Any surfactant which aids the dispersion and/or stabilization of a gas component in the fluid to form an energized fluid can be used. Viscoelastic surfactants, such as those described in U.S. Pat. Nos. 6,703,352, 6,239,183, 6,506,710, 7,303,018 and 6,482,866, each of which are incorporated by reference herein in their entirety, are also suitable for use in fluids in some embodiments. Examples of suitable surfactants also include, but are not limited to, amphoteric surfactants or zwitterionic surfactants. Alkyl betaines, alkyl amido betaines, alkyl imidazolines, alkyl amine oxides and alkyl quaternary ammonium carboxylates are some examples of zwitterionic surfactants. An example of a useful surfactant is the amphoteric alkyl amine contained in the surfactant solution AQUAT 944 (available from Baker Petrolite of Sugar Land, Tex.). A surfactant may be added to the crosslinkable fluid in an amount in the range of about 0.01 wt % to about 10 wt %, such as about 0.1 wt % to about 2 wt %.

Charge screening surfactants may be employed. In some embodiments, the anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates may be used. Anionic surfactants have a negatively charged moiety and a hydrophobic or aliphatic tail, and can be used to charge screen cationic polymers. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Cationic surfactants have a positively charged moiety and a hydrophobic or aliphatic tail, and can be used to charge screen anionic polymers such as CMHPG.

In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids.

Friction reducers may also be added to the crosslinkable fluid. Any suitable friction reducer polymer, such as polyacrylamide and copolymers, partially hydrolyzed polyacrylamide (at a concentration of less than 0.01% by weight), poly(2-acrylamido-2-methyl-1-propane sulfonic acid) (polyAMPS), and polyethylene oxide, may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing or even minimize the use of conventional fluid loss additives. Latex resins or polymer emulsions may be incorporated as fluid loss additives. Shear recovery agents may also be used in embodiments.

Diverting agents may be added to improve penetration of the crosslinkable fluid into lower-permeability areas when treating a zone with heterogeneous permeability. The use of diverting agents in formation treatment applications is known, such as given in Reservoir Stimulation, $3^{rd}$ edition, M. Economides and K. Nolte, eds., Section 19.3.

The crosslinkable fluid for treating a subterranean formation of the present disclosure may be a fluid that has a viscosity of above about 50 centipoise at 100 sec$^{-1}$, such as a viscosity of above about 100 centipoise at 100 sec$^{-1}$ at the treating temperature, which may range from a surface temperature to a bottom-hole static (reservoir) temperature, such as from about −40° C. to about 150° C., or from about 10° C. to about 70° C., or from about 25° C. to about 60° C., or from about 32° C. to about 55° C.

In the methods of the present disclosure, crosslinking may be accomplished by exposing the crosslinkable fluid to predetermined conditions (such pH, ionic, heat, and/or pressure) that favor the release of the crosslinker from the parylene-coated particle. In embodiments, the crosslinker may be substantially released from the parylene-coated particle upon exposure to the predetermined conditions, such as about 75% of the crosslinker is released from the parylene-coated particle, or about 95% of the crosslinker is released from the parylene-coated particle, or about 99.9% of the crosslinker is released from the parylene-coated particle, in a time no less than about 24 hours, or in a time no less than about one hour, such as a time no less than about 10 minutes.

In embodiments, the crosslinkable components are not substantially crosslinked under the subterranean conditions (downhole conditions) until the crosslinkable fluid is introduced into the desired location. In other words, the diffusion (and/or release) of the crosslinker from the parylene-coated particles (and thus crosslinking reaction between the crosslinker and the crosslinkable component) does not substantially occur before the crosslinkable fluid is downhole. For example, at least 80% (by weight) of the crosslinkable component remains uncrosslinked (under the conditions experienced downhole) until the crosslinkable fluid is positioned in the desired location in the wellbore in the vicinity of the subterranean formation to be treated, such as at least 95% (by weight), or as at least 99% (by weight) of the crosslinkable component remains uncrosslinked (under the conditions experienced downhole) before the crosslinkable fluid is positioned in the desired location in the wellbore in the vicinity of the subterranean formation to be treated. In embodiments, less than 5% (by weight) of the crosslinker diffuses (and/or is released) from the parylene-coated particle before the crosslinkable fluid is positioned in the desired location in the wellbore in the vicinity of the subterranean formation to be sealed, such as less than 2% (by weight), or less than 0.5% (by weight) of the crosslinker diffuses from the parylene-coated particle until the crosslinkable fluid is positioned in the desired location in the wellbore in the vicinity of the subterranean formation to be treated.

In embodiments, the crosslinkable fluid systems are introduced into the subterranean material surrounding a wellbore by flowing the crosslinkable fluid system into the wellbore. In embodiments, the one or more crosslinkable components of the crosslinkable fluid does not crosslink until after its introduction into the wellbore, such as injection and/or permeation into the subterranean formation.

The crosslinkable fluids of the present disclosure may be suitable for use in numerous subterranean formation types. For example, formations for which the crosslinkable fluids of the present disclosure may be used include sand, sandstone, shale, chalk, limestone, and any other hydrocarbon bearing formation.

The portion of the wellbore through which the crosslinkable fluid is injected into the treated zone can be open-hole (or comprise no casing) or can have previously received a casing. If cased, the casing is desirably perforated prior to injection of the crosslinkable fluid. Optionally, the wellbore can have previously received a screen. If it has received a screen, the wellbore can also have previously received a gravel pack, with the placing of the gravel pack optionally occurring above the formation fracture pressure (a frac-pack). Techniques for injection of fluids with viscosities similar to those of the crosslinkable fluids of the present disclosure are well known in the art and may be employed with the methods of the present disclosure. For example, known techniques may be used in the methods of the present disclosure to convey the crosslinkable fluids of the present disclosure into the subterranean formation to be treated.

In embodiments, the crosslinkable fluid may be driven into a wellbore by a pumping system that pumps one or more crosslinkable fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, but not limited to, using data obtained either downhole from the wellbore, surface data, or some combination thereof. Methods of this disclosure may include using a surface data acquisition and/or analysis system, such as described in U.S. Pat. No. 6,498,988, the disclosure of which is hereby incorporated by reference in its entirety.

The fluids and/or methods may be used for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications," Encyclopedia of Polymer Science and Engineering, vol. 10, pp. 328-366 (John Wiley & Sons, Inc. New York, N.Y., 1987) and references cited therein.

In various embodiments, hydraulic fracturing involves pumping a proppant-free viscous fluid, or pad—such as water with some fluid additives to generate high viscosity—into a well faster than the fluid can escape into the formation so that the pressure rises and the rock breaks, creating artificial fractures and/or enlarging existing fractures. Then, proppant particles are added to the fluid to form slurry that is pumped into the fracture to prevent it from closing when the pumping pressure is released. In the fracturing treatment, fluids of are used in the pad treatment, the proppant stage, or both.

Breaker Coated with Parylene

In some embodiments, the chemical entity that is coated with parylene is a breaker (and/or has a breaking function). The extent to which this chemical entity may be loaded into the parylene-coated particle is discussed above. The purpose of this component is to "break" or diminish the viscosity of a fluid, such as a viscosified treatment fluid, so that this fluid is more easily recovered from the formation during cleanup. Conventional fracturing fluid breaking technologies are known. For example, the design of fracturing treatments is described in U.S. Pat. No. 7,337,839, the disclosure of which is hereby incorporated by reference in its entirety.

"Breaker" and/or the phrase "breaking agent" (hereinafter collectively referred to as a breaker or breakers) refer, for example, to a compound or mixture that assists in diminishing the viscosity and/or the decomposition of a component of a viscosified fluid, such as the decomposition of a three-dimensional polymerized structure of the crosslinked composition discussed above, under at least some downhole conditions.

With regard to breaking down the viscosity, chemical reagents including, for example, oxidizers, chelants, or acids may be loaded into the parylene-coated particles and used in the methods of the present disclosure to diminish the viscosity of a fluid, such as a viscosified treatment fluid. After the breakers diffuse out of the parylene-coated particle and/or or released from the parylene-coated particles, breakers may reduce the viscosity of a viscosified fluid comprising polymers, by reducing a polymer's molecular weight by the action of chemical reagent, such as an acid, base, an oxidizer, a chelant, or some combination of these on the polymer itself.

For example, in the case of the borate-crosslinked gels (discussed above), breakers, such as an acid, may be used, which after released from the acid-containing parylene-coated particle would decrease the pH and therefore decrease the effective concentration of the active crosslinker, the borate anion. Lowering the pH by emptying the acid-containing parylene-coated particle can easily remove the borate/polymer bonds because at lower pH, the borate associates with a hydrogen and is not available for cross-linking, thus gelation by borate ion is minimized.

In other embodiments, where the fracturing treatment involves the deployment of polylactic acid (PLA) materials, such as fibers or proppants, which is described in U.S. Pat. Nos. 6,776,235; 7,451,812; 7,581,590; 8,066,068; 8,141,637; and 7,798,224, the disclosures of which are incorporated herein by reference in their entities, a base may function as a breaker because it may be used to raise the pH of the treatment fluid (post-deployment of the PLA fibers) after the base is released from the base-containing parylene-coated particle. The resulting increase in the pH may accelerate the PLA degradation, even under low temperature conditions, such as temperatures insufficient to thermally degrade PLA. Further details regarding loading a base into a parylene-coated particle are discussed above.

In embodiments, a breaker-containing parylene-coated particle may be added to a viscosified or unviscosified treatment fluid before this fluid is introduced into the wellbore, or the breaker-containing parylene-coated particle may be added as a separate fluid, such as an aqueous or organic based fluid, that is introduced into the wellbore after at least a portion or the entire amount of viscosified or unviscosified treatment fluid has been introduced into the wellbore.

As used herein, the phrases "viscosified fluid," "viscosified treatment fluid" or "viscosified fluid for treatment" (hereinafter generally referred to as a "viscosified fluid" unless specified otherwise) mean, for example, a composition comprising a solvent, a viscosifying material, such as a polymeric material, which may include any crosslinkable compound and/or substance with a crosslinkable moiety (hereinafter "crosslinkable component"), and optionally one or more breaker-containing parylene-coated particles. The viscosified fluids of the present embodiments, may be substantially inert to any produced fluids (gases and liquids) and other fluids injected into the wellbore or around the wellbore.

In some embodiments, the methods of the present disclosure may comprise contacting and/or reacting a viscosified fluid, such as a viscosified polymer treatment fluid introduced into the formation via the wellbore, with a breaker that has diffused from a breaker-containing parylene-coated particle. In some embodiments, the methods of the present disclosure facilitate breaking of the viscosified fluid after a fracturing or well treatment has finished.

In embodiments, the "reaction" of the viscosified fluid ("viscosified treatment fluid" or "viscosified fluid for treatment") with the breakers to reduce the viscosity of the viscosified fluid (the breaking effect) occurs after the breaker has diffused and/or been released from the breaker-containing parylene-coated particle. In embodiments, after an effective amount of the breaker has been released from the breaker-containing parylene-coated particle, the reaction to reduce the viscosity of the viscosified treatment fluid may occur at any suitable temperature.

The effective amount of the breaker released from the breaker-containing parylene-coated particle into the viscosified or unviscosified treatment fluid (or aqueous or organic based fluid) may depend on several factors including the specific breaker selected, the amount and ratio of the other components in the viscosified or unviscosified treatment fluid (or aqueous or organic based fluid), the contacting time desired, the temperature, pH, and ionic strength of the viscosified or unviscosified treatment fluid (or aqueous or organic based fluid).

In embodiments where the breaker-containing parylene-coated particle is introduced in a fluid separate from the viscosified or unviscosified fluid, an effective amount of breaker may be reached when the amount of breaker diffused and/or released from the parylene-coated particle into an aqueous or organic based fluid is in excess of about 0.001% by weight of the aqueous or organic based fluid, such as in an amount in the range of from about 0.002% to about 0.1% by weight of aqueous or organic based fluid, or in an amount in the range of from about 0.003% to about 0.01% by weight of the aqueous or organic based fluid, or in an amount in the range of from about 0.004% to about 0.008% by weight of the aqueous or organic based fluid.

As suggested above, any known breaker that can be released from the parylene-coated particle may be used in the methods of the present disclosure. Suitable breakers that may be comprised in the parylene-coated particles of the present disclosure may include chemical reagents, such as oxidizers, chelants, and acids. Additional suitable breakers that may be contained in the parylene-coated particles of the present disclosure may include the breakers described in U.S. Patent Application Publication No. 2013/0228334, which are breakers comprising at least one organic peroxide having a structural feature selected from cyclic peroxide segment and/or multiple linear peroxide moieties per molecule. The disclosure of U.S. Patent Application Publication No. 2013/0228334 is hereby incorporated by reference in its entirety. Additional suitable breakers that may be contained in the parylene-coated particles of the present disclosure may include the breakers described in U.S. Pat. Nos. 7,678,745; 7,888,297; 7,159,658; 6,924,254; 7,915,336; and 7,456,212; the disclosures of which are incorporated herein by reference in their entireties.

In embodiments, the core (comprising the breaker) of the parylene-coated particle may have any desired diameter. For example, the core (comprising the breaker) of the parylene-coated particles used in the methods of present disclosure may have an average core size that falls in a range of from about 10 nanometers to about 100 microns, such as an average core size that falls in a range of from about 100 nanometers to about 10 microns, or an average core size that falls in a range of from about 500 nanometers to about 5 microns.

In some embodiments, the core (comprising the breaker) of the parylene-coated particle used in the methods of present disclosure may comprise the breaker in an amount greater than 95% by weight of the core material, such as more than 93% by weight of the core material, or more than 90% by weight of the core material. In some embodiments, the breaker molecules are present in the parylene-coated particle at a weight percent of from about 95% to about 50% relative to the weight of the parylene-coated particle), or about 85% to about 70% relative to the weight of the parylene alone.

In embodiments, the breaker-containing parylene-coated particle may possess a thermal stability range (in which it will not decompose, or less than 15% by mass deterioration, decomposition, or release of the chemical entity, such as less than 5% by mass deterioration, decomposition, or release of the chemical entity) of at least 10° C. higher than the highest temperature that is observed in the subterranean formation being treated, such as a thermal stability range of at least up to 200° C., or a thermal stability range of greater than about 60° C. to about 200° C., or a thermal stability range of greater than from about 80° C. to about 190° C., or a thermal stability range of greater than from about 100° C. to about 180° C.

In embodiments, the breaker-containing parylene-coated particles may have a pressure stability range of at least 100 psi higher than the highest pressure that is observed in the subterranean formation being treated, such as a pressure stability range of greater than about 3,000 psi to about 25,000 psi, or a pressure stability range of greater than from about 4,000 psi to about 6,000 psi. In embodiments, the breaker-containing parylene-coated particles may have a pH stability range of from about 1 to about 14, or a pH stability range of from about 3 to about 13, or a pH stability range of from about 7 to about 12.

The breaker-containing parylene-coated particles for use in the methods of the present disclosure may be used for temporarily storing the breaker for a predetermined amount of time, for example, while the breaker is being transported downhole after incorporation into a treatment fluid. In embodiments, the breaker and parylene coating may be selected such that the breaker may be temporarily stored in the parylene-coated particle for a predetermined time after loading (such as minutes, hours or days), for example, in a time no less than about 24 hours, or in a time no less than about one hour, such as a time no less than about 10 minutes.

Subsequently, after the predetermined amount of time has passed, the breaker may be released from the parylene-coated particles into the bulk of the crosslinked fluid, such as, for example, to initiate the depolymerization of the polymer contained therein and/or otherwise act in its intended capacity as a breaker.

In some embodiments, after the breaker-containing parylene-coated particles has been exposed to a predetermined downhole condition (or set of conditions), such as a predetermined temperature, a predetermined pressure, a predetermined pH, a predetermined treatment fluid component concentration, or combination thereof, the breaker may be released from the parylene-coated particles into the bulk of the crosslinked and/or viscous fluid, such as, for example, to initiate the depolymerization of the polymer contained therein and/or otherwise act in its intended capacity as a breaker.

In embodiments, the breaker is present in the breaker-containing parylene-coated particles at a weight percent of from about 95% to about 50% relative to the weight of the parylene-coated particles, or about 93% or about 90%, or about 85% to about 70% relative to the weight of the parylene-coated particles.

In some embodiments, the "reaction" of the viscosified fluid (viscosified treatment fluid" or "viscosified fluid for treatment") with the breakers to reduce the viscosity of the viscosified fluid (the breaking effect) does not substantially occur, or does not occur, until the breaker is released from the breaker-containing parylene-coated particles, such as a breaker-containing parylene-coated particle that has been exposed to predetermined subterranean conditions. For example, such a reaction, which may include decomposing and/or depolymerizing the polymeric material of the viscosified fluid, does not substantially occur, or does not occur, until the breaker-containing parylene-coated particle is downhole and exposed to predetermined downhole conditions, such as a sufficient heat, a sufficient pressure, or a sufficient downhole component concentration, that is effective to initiate the release of the breaker from the breaker-containing parylene-coated particle. In specific embodiments, such a reaction, which may include the breaking agent reacting with the polymeric material of the viscosified fluid to decompose and/or depolymerize the polymeric material of the viscosified fluid, does not substantially occur, or does not occur, until the breaker-containing parylene-coated particle is downhole and the breaker is released from the parylene-coated particle and exposed to heat, such as a sufficient heat to initiate the reaction to reduce the viscosity of the viscosified treatment fluid, such as a temperature in the range of from about 79.4° C. (175° F.) to about 204° C. (400° F.), such as from about 79.4° C. (175° F.) to about 121° C. (250° F.), from about 93.3° C. (200° F.) to about 121° C. (250° F.), or from about 93.3° C. (200° F.) to about 107° C. (225° F.).

In embodiments, the breaker or breaking agent may comprise at least one organic peroxide. As described in U.S. Patent Application Publication No. 2013/0228334, which is incorporated by reference above, the phrase "breaking agent comprising at least one organic peroxide" refers, for example, to breakers or breaking agents comprising at least one organic peroxide molecule having a structural feature selected from cyclic peroxide segment and/or multiple linear peroxide moieties per molecule. In such embodiments, after an effective amount of the breaker has been released from the parylene-coated particle, the reaction to reduce the viscosity of the viscosified treatment fluid may be initiated by exposing the breaker to a temperature in the range of from about 80° C. to about 204° C., such as from about 80° C. to about 120° C., from about 90° C. to about 120° C., or from about 90° C. to about 100° C.

In some embodiments, the breaker-containing parylene-coated particles may be present in the viscosified or unviscosified fluid before the viscosified or unviscosified treatment fluid is introduced into the wellbore. In such embodiments, the breaker-containing parylene-coated particles may be present in the viscosified or unviscosified fluid in any desired amount, such as in an amount that would to achieve a breaker weight percent in excess of about 0.001% by weight of the viscosified or unviscosified fluid upon release of the breaker from the breaker-containing parylene-coated particles, such as in an amount in the range of from about 0.01% to about 0.6% by weight of the viscosified or unviscosified fluid upon release of the breaker from the parylene-coated particles, or in an amount in the range of from about 0.04% to about 0.3% by weight of the viscosified or unviscosified fluid upon release of the breaker from the breaker-containing parylene-coated particles, or in an amount in the range of from about 0.05% to about 0.01% by weight of the viscosified or unviscosified fluid upon release of the breaker from the breaker-containing parylene-coated particles.

In embodiments, upon the release of the breaker from the breaker-containing parylene-coated particles, the concentration ratio of the breaker to the polymeric material (breaker: polymeric material) in the viscosified or unviscosified fluids may be in a range of from about 1:100 to about 1:50.

The release of the breakers during the methods of the present disclosure may be achieved by exposure to predetermined subterranean environmental conditions, such as a predetermined temperature, a predetermined pressure, a predetermined concentration or a predetermined pH, of the subterranean zone in which the breaker-containing parylene-coated particles are placed.

In embodiments, the reduction of the viscosity, such as the viscosity reduction as a result of the breaking agent acting to decompose and/or depolymerize the polymeric material, of the viscosified fluid does not occur to any extent until the breaker-containing parylene-coated particle is exposed to sufficient downhole or subterranean conditions that would initiate the diffusion and/or release of the breaker from the breaker-containing parylene-coated particle.

In embodiments, the breaking effect of the breaking agent may be accomplished either in the presence or absence of a breaker activator (also referred to as a "breaking aid"), which optionally may be loaded into a parylene-coated particle. A breaker activator may be present to encourage the redox cycle that activates the breaking agent. In some embodiments, the breaker activator may comprise an amine, such as an oligoamine activators, for example, tetraethylenepentaamine (TEPA) and pentaethylenehexaamine (PEHA); or a metal chelated with chelating agents. Suitable metals may include iron, chromium, copper, manganese, cobalt, nickel, vanadium, aluminum, and boron. Further breaker aids may include ureas, ammonium chloride and the like, and those disclosed in, for example, U.S. Pat. Nos. 4,969,526, 4,250,044 and 7,678,745 the disclosures of which are incorporated herein by reference in their entireties.

The amount of breaker activator that may be included in the viscosified or unviscosified treatment fluid (or aqueous or organic based fluid) is an amount that will sufficiently activate the breaking effect of the breaker once the breaker diffuses and/or is released from the breaker-containing parylene-coated particle. In embodiments, the breaker activator will be present in the viscosified or unviscosified treatment fluid (or aqueous or organic based fluid) in an amount in the range of from about 0.01% to about 1.0% by weight, such as from about 0.05% to about 0.5% by weight, of the viscosified or unviscosified treatment fluid (or aqueous or organic based fluid).

The polymers present in the viscosified fluid or viscosified treatment fluid may be those commonly used with fracturing fluids, such as those mentioned above. The polymers may be used in either crosslinked or non-crosslinked form. The polymers may be capable of being crosslinked with any suitable crosslinking agent, such as metal ion crosslinking agents. Examples of such materials include the polyvalent metal ions of boron, aluminum, antimony, zirconium, titanium, chromium, etc., that react with the polymers to form a composition with adequate and targeted viscosity properties for various operations.

In embodiments, the action of the breaker released from the breaker-containing parylene-coated particles may decrease the viscosity of the viscosified fluid by at least an order of magnitude at the treating temperature, such as, for example, reducing the viscosity from at least about 10,000 centipoise at 100 sec$^{-1}$ at the treating temperature to no greater than about 1,000 centipoise at 100 sec$^{-1}$ at the treating temperature; or by at least two orders of magnitude at the treating temperature, or to a viscosity below that of the initial unviscosified fluid (for example from at least about 10,000 centipoise at 100 sec$^{-1}$ at the treating temperature to less than about 100 centipoise at 100 sec$^{-1}$ at the treating temperature).

In embodiments, the subterranean formation and the viscosified fluid may have a temperature in the range of from about 0° C. to about 300° C., such as in the range of from about 20° C. to about 265° C., or in the range of from about 40° C. to about 250° C.

The unviscosified fluids or compositions suitable in the methods of the present disclosure may comprise a crosslinkable component, which are discussed in detail above. The concentration of the crosslinking agent (including the spread crosslinker) in the treatment fluid may be from about 0.001 wt % to about 10 wt %, such as about 0.005 wt % to about 2 wt %, or about 0.01 wt % to about 1 wt %.

Suitable solvents for use with the unviscosified fluid, viscosified fluid, and/or breaker-containing parylene-coated particles may be aqueous or organic based, such as the aforementioned aqueous or organic solvents. In embodiments, the solvent, such as an aqueous solvent, may represent up to about 99.9 weight percent of the unviscosified or viscosified fluid, such as in the range of from about 85 to about 99.9 weight percent of the viscosified fluid, or from about 98 to about 99.7 weight percent of the viscosified fluid.

While the treatment fluids, such as viscosified fluids or viscosified treatment fluids of the present embodiments, are described herein as comprising the above-mentioned components, it should be understood that the treatment fluids may optionally comprise other chemically different materials, which optionally may be loaded in a parylene-coated particles, some of which have already been described above. For example, the treatment fluids, such as unviscosified and/or viscosified fluids of the present embodiments, may further comprise stabilizing agents, surfactants, diverting agents, or other additives, which optionally may be loaded in one or more parylene-coated particles. Additionally, the treatment fluids, such as unviscosified and/or viscosified fluids, may comprise a mixture of various crosslinking agents, and/or other additives, such as fibers or fillers, provided that the other components chosen for the mixture are compatible with the intended application. In embodiments, the treatment fluids, such as unviscosified and/or viscosified fluids of the present embodiments, may further comprise one or more components selected from the group consisting of a conventional gel breaker (not loaded into a parylene-coated particle), a buffer, a proppant, a clay stabilizer, a gel stabilizer, a surfactant and a bactericide. Furthermore, the treatment fluids, such as unviscosified and/or viscosified fluids of the present embodiments, may comprise buffers, pH control agents, and various other additives added to promote the stability or the functionality of the fluid. The components of the treatment fluids, such as unviscosified and/or viscosified fluids of the present embodiments, may be selected such that they may or may not react with the subterranean formation that is to be treated.

Acidizing Agent (or Acid) Coated with Parylene

In some embodiments, the chemical entity that is covered with parylene is an acid or acidizing agent. Coating the acid or acidizing agent with parylene may allow for more efficient utilization and placement of the acid in the subterranean formation for the desired application or treatment. The ability of the parylene-coated particles to temporarily store and/or chemically isolate the chemical entity, such as an acid, until the chemical entity, such as an acid, is in the vicinity of the target zones of interest minimizes the loss and inefficient reaction of the acid with components that are not of interest.

Acidizing is a known treatment used to stimulate hydrocarbon production from a well. Known acidizing treatments may be modified to incorporate the acid-containing parylene-coated particles and/or acid-containing composite parylene-coated particles as an acidizing agent source. For example, two types of acidizing treatments that may be modified to incorporate the acid-containing parylene-coated particles and/or acid-containing composite parylene-coated particles as an acidizing agent source may include: (1) matrix acidizing and (2) fracture acidizing. In embodiments, the acid-containing parylene-coated particles and/or acid-containing composite parylene-coated particles are sufficiently chemically and thermally stable during the conditions, such as the temperatures, injection rates and pressures, used during conventional fracture acidizing methods and also conventional matrix acidizing methods.

The acidizing treatments or acidizing methods of the present disclosure may include one or more treatment fluids comprising an acid-containing parylene-coated particle and/or an acid-containing composite parylene-coated particle, but otherwise use conventional acidizing techniques known in the art.

A variety of acidizing agents may be employed in the acid-containing parylene-coated particles and/or acid-containing composite parylene-coated particles. Examples of suitable acidizing agents include mineral acids, hydrochloric acid, hydrofluoric acid, sulfuric acid, nitric acid, perchloric acid, hydrobromic acid, phosphoric acid, boric acid, organic acids, acetic acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, a salt of any acid, and mixtures thereof.

In embodiments, the treatment fluids containing an acidizing agent may contain a sufficient amount of acid-containing parylene-coated particle and/or acid-containing composite parylene-coated particle in order to achieve an acid concentration in the range of from about 5% to about 80% by weight of the treatment fluid in the target area for treatment after the acid diffuses and/or is released from the acid-containing parylene-coated particle, such as an acid concentration in the range of from about 10% to about 25% by weight of the treatment fluid in the target area for treatment after the acid diffuses and/or is released from the acid-containing parylene-coated particle (and/or acid-containing composite parylene-coated particle), an acid concentration in the range of from about 12% to about 20% by weight of the treatment fluid in the target area for treatment after the acid diffuses and/or is released from the acid-containing parylene-coated particle (and/or acid-containing composite parylene-coated particle).

In embodiments, the acid-containing parylene-coated particle, such as a parylene-coated particle comprising a strong acid, like hydrochloric acid, may be distributed in a polymeric material, and/or coated in a polymeric material, to form an acid-containing composite parylene-coated particle. Any suitable polymeric material may be used to form the composite parylene-coated particles used in the methods of the present disclosure. However, where the acidizing agent is a strong acid, such as hydrochloric acid, the acid-containing parylene-coated particle may be prepared and subsequently distributed and/or coated in a polymeric material that is known to be stable to a strongly acidic environment. In embodiments, such an acid stable polymeric material may be a gel and/or inter-polymer complex (IPC) comprising polyacrylamide (greater than 1%) crosslinked by a non-metallic crosslinker as described above, and described in U.S. Patent Application Publication No. 2012/0138294, the disclosure of which has already been incorporated by reference.

In embodiments, acid-containing composite parylene-coated particles may be employed to further delay the diffusion of the chemical entity (such as a strong acid) from the parylene-coated particle to the bulk of the treatment fluid or acidizing fluid. Because the chemical entity (such as a strong acid) will diffuse out of the parylene-coated particle and then out of the acid stable polymeric material, the delay can be increased by increasing the size and/or depth of the acid stable polymer layer into which the acid-containing parylene-coated particle is dispersed. The effective amount of loaded parylene-coated particles distributed in the acid stable polymeric material and/or the size of the acid stable polymer material particles may be varied as desired for the selected application.

In embodiments, the polymeric material of the composite parylene-coated particle may be a gel that is known to be stable to exposure to strong acids, such as a polyacrylamide crosslinked with a non-metallic crosslinker wherein the polyacrylamide is present in the gel at a concentration of greater than or equal to about 1 wt %, or greater than or equal to about 2 wt % and less than or equal to about 10 wt %, based on the total weight of the gel, as described in U.S. Patent Application Publication No. 2012/0138294.

In embodiments, the gel (produced according to U.S. Patent Application Publication No. 2012/0138294) of the composite parylene-coated particle (including, for example, a strong acid) may absorb water when placed in contact with an aqueous solution. In embodiments, the gel of the composite parylene-coated particle (comprising a strong acid) in contact with water may uptake greater than or equal to about 100% by weight of water, or greater than or equal to about 200% by weight of water, based on the weight of the gel present.

In embodiments, the gel of the composite parylene-coated particle may be formed at a pH of greater than or equal to about 9 and remains as a gel when the pH of the gel is lowered below 9, or when the pH of the gel is lowered below about 7, or when the pH of the gel is lowered below about 5, and/or when the pH of the gel is lowered below about 3. Accordingly, in embodiments, the gels of the acid-containing composite parylene-coated particle may be non-reversible once formed, pH stable once formed, or a combination thereof. In embodiments, such a gel is coated on the parylene-coated particle comprising a strong acid, such as hydrochloric acid, after the pH stable gel is formed. In embodiments, the parylene-coated particles comprising a strong acid, such as hydrochloric acid, are dispersed in such a gel after the pH stable gel is formed.

The water utilized to form the treatment fluid or acidizing fluid comprising the acid-containing parylene-coated particle and/or acid-containing composite parylene-coated particle can be any aqueous fluid which does not adversely react with the acidizing agent, or other components in the acidizing fluid. For example, the water can be fresh water, brine, salt containing water solutions such as sodium chloride solutions, potassium chloride solutions, ammonium chloride solutions, seawater, brackish water or the like.

The treatment fluid or acidizing fluid comprising the acid-containing parylene-coated particles and/or acid-containing composite parylene-coated particles may also include one or more corrosion inhibitors and corrosion inhibitor intensifiers to prevent the aqueous acidizing agent solution from corroding metal pumps, tubular goods and the like. Such corrosion inhibitors, corrosion inhibitor intensifiers and other additives which can be included in the aqueous acidizing agent solution are known to those skilled in the art.

In embodiments, an acidizing treatment for a carbonate formation may include a sequential injection of at least two treatment fluids: an acidizing treatment fluid comprising an acid-containing parylene-coated particle and/or acid-containing composite parylene-coated particle, which optionally may contain a mixture of acids, and an after flush treatment fluid. Optionally, a preflush treatment fluid may also be injected into the carbonate formation. In embodiments, an acidizing treatment for a sandstone formation may include a sequential injection of at least three treatment fluids: a preflush treatment fluid, an acidizing treatment fluid comprising an acid-containing parylene-coated particle and/or acid-containing composite parylene-coated particle, which optionally may contain a mixture of acids, and an after flush treatment fluid.

The following are some of the known methods of acidizing hydrocarbon bearing formations which can be used as part of the present method: U.S. Pat. Nos. 3,215,199; 3,297,090; 3,307,630; 2,863,832; 2,910,436; 3,251,415; 3,441,085; and 3,451,818, which are hereby incorporated by reference in their entirety. The methods described in the above mentioned patents may be modified to incorporate an acid-containing parylene-coated particle and/or an acid-containing composite parylene-coated particle as the source of acid or acidizing agent (in the acidizing procedures thereof, whether matrix acidizing or fracture acidizing), but otherwise the techniques and procedures described therein.

In embodiments, as discussed above, the acid-containing parylene-coated particles and/or acid-containing composite parylene-coated particles may also be selected such that when they are exposed to downhole conditions, the acidizing agents are released, such as by diffusion and/or desorption processes, from the acid-containing parylene-coated particle and/or acid-containing composite parylene-coated particles.

The acid-containing parylene-coated particles and/or acid-containing composite parylene-coated particles for use in the methods of the present disclosure may be used for temporarily storing the acidizing agent for a predetermined amount of time, for example, while the acidizing agent is being transported downhole after incorporation into a treatment fluid. In embodiments, the acidizing agent and parylene-coated particle may be selected such that the acidizing agent may be temporarily stored in the acid-containing parylene-coated particle and/or acid-containing composite parylene-coated particles for a predetermined time after forming the acid-containing parylene-coated particle or being exposed to a predetermined condition (such as minutes, hours or days), for example, from about 5 to about 2,000 minutes, such as from about 10 to about 1,000 minutes, or 20 to about 500 minutes, or from about 30 to about 120 minutes. Subsequently, after the predetermined amount of time has passed (such as after being exposed to a predetermined threshold condition), the acidizing agent may be released from the acid-containing parylene-coated particle and/or acid-containing composite parylene-coated particles into the bulk of the treatment fluid, such as, for example, to react with the target formation and/or otherwise act in its intended capacity as an acidizing agent.

In some embodiments, after the acid-containing parylene-coated particles and/or acid-containing composite parylene-coated particles have been exposed to a predetermined downhole condition (or set of conditions), such as a predetermined temperature, a predetermined pressure, a predetermined pH, a predetermined treatment fluid component concentration, or combination thereof, the acidizing agent may be released from the acid-containing parylene-coated particle and/or acid-containing composite parylene-coated particles into the bulk of the treatment fluid, such as, for example, to react with the target formation and/or otherwise act in its intended capacity as an acidizing agent.

In embodiments, the acidizing agent is present in the acid-containing parylene-coated particle and/or acid-containing composite parylene-coated particles at a weight percent of from about 25% to about 1,000% relative to the weight of the parylene alone (without any acidizing agent), or about 60% or about 300%, or about 80 to about 200% relative to the weight of the parylene alone.

In the methods of the present disclosure, the formation of an acid-containing parylene-coated particle and/or acid-containing composite parylene-coated particle may occur by any suitable method, similar to those discussed above with respect to chemical entities. In some embodiments, the entire coating process may occur at a temperature below about 0° C., such as temperature below about −20° C., or a temperature in the range of from about −20° C. to about −50° C.

The foregoing is further illustrated by reference to the following examples, which are presented for purposes of illustration and are not intended to limit the scope of the present disclosure.

EXAMPLES

Example 1

A sample of 20-40 mesh NaOH beads coated with 8-10% by weight of parylene was manufactured. The release profile of encapsulated NaOH was measured using electric conductivity (Accumet AR50 Dual Channel pH/ION/Conductivity Meter that was calibrated via an appropriate cell). Experimental data was acquired by pouring 100 mL of DI water into 125 mL glass bottle at which point an initial temperature and pH reading was assessed. Then 1 gram of the respecting sample was mixed into the DI water and stirred gently with the probe. Temperature and conductivity reading were then acquired as a function of time. The results are reported in FIG. 1. RT is a room temperature of about 70° F.

These results demonstrate that the NaOH is retained in the particles of the present disclosure for a duration that is considerably longer than conventional particles that encapsulate NaOH, such as NaOH coated with lipids (which release over 50% of encapsulated NaOH within first 5 minutes of contact with water at ambient temperature and thus barely slowed down the dissolution of NaOH compared to a non-encapsulated material).

Example 2

Sodium Bromate is commonly used as a high temperature oxidative breaker for polymer fluids. To delay the release at high temperatures (that is above 250° F.), heavy amounts of coatings are conventionally applied. A typical conventional encapsulated $NaBrO_3$ contain 30-50% of polyvinylidene chloride acrylic materials and/or some other conventional coating.

A sample of parylene coated sodium bromate was manufactured. The amount of coating was 10% by weight. This sample was tested for the release of $NaBrO_3$ in comparison with two conventional samples of polyvinylidene chloride (PvDC) coated $NaBrO_3$ (35% coating by weight) using electric conductivity (Accumet AR50 Dual Channel pH/ION/Conductivity Meter and methodology similar to that described above in Example 1). The same source of uncoated $NaBrO_3$ was used in both cases. Tests were run in duplicates.

Figure 2:
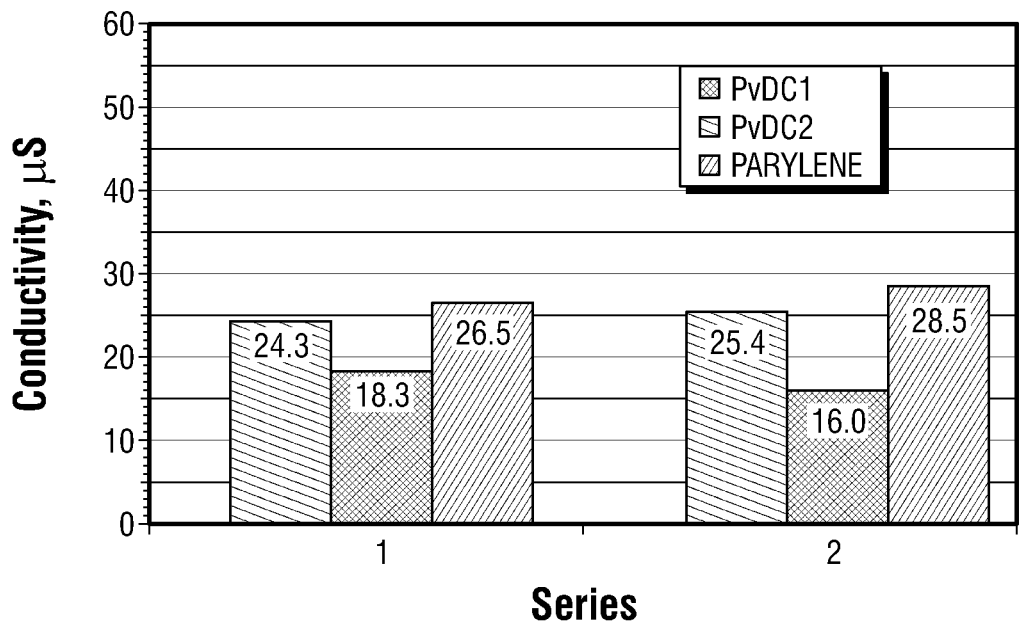
FIG. 2 is an illustration of comparative data relating to the release of $NaBrO_3$ from a parylene-coated particle (containing $NaBrO_3$ encapsulated therein) and two separate polyvinylidene chloride coated particle samples (containing $NaBrO_3$ encapsulated therein).

As suggested in FIG. 2, at 193° F., the parylene coated sample provided a similar release provide compared to the coated PvDC samples, which contained about 3.5 times as much coating material.

Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of PARYLENE COATED CHEMICAL ENTITIES FOR DOWNHOLE TREATMENT APPLICATIONS. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A fluid for treating a subterranean formation comprising:
    a solvent; and
    a composition comprising a parylene-coated particle, wherein the particle comprises a chemical entity selected from the group consisting of a crosslinker, a breaker, an acid, and a base.

2. The fluid for treating the subterranean formation of claim 1, wherein the parylene-coated particle comprising the chemical entity possesses a chemical stability such that less than 5% mass deterioration or decomposition occurs when the parylene-coated particle comprising the chemical entity is exposed to downhole environments for periods greater than a week.

3. The fluid for treating the subterranean formation of claim 1, wherein the parylene-coated particle is distributed in a material selected from the group consisting of a polymer particle and an inter-polymer network.

4. The fluid for treating the subterranean formation of claim 1, wherein an amount of parylene in the parylene-coated particle is in the range of from about 1% to about 40% by weight of the total weight of the parylene-coated particle.

5. A fluid for treating a subterranean formation comprising:
    a solvent;
    a crosslinkable component; and
    a crosslinking composition comprising a crosslinker-containing parylene-coated particle, wherein the particle comprises a crosslinker.

6. The fluid for treating the subterranean formation of claim 5, wherein an amount of parylene in the crosslinker-containing parylene-coated particle is in the range of from about 1% to about 40% by weight of the total weight of the crosslinker-containing parylene-coated particle.

7. The fluid for treating a subterranean formation of claim 5, wherein the crosslinker is present in the fluid in an amount of from about 0.001 wt % to about 10 wt % relative to the total weight of the fluid.

8. The fluid for treating a subterranean formation of claim 5, wherein the crosslinkable component comprises a guar gum, a locust bean gum, a tara gum, a honey locust gum, a tamarind gum, a karaya gum, an arabic gum, a ghatti gum, a tragacanth gum, a carrageenen, a succinoglycan, a xanthan, a diutan, a hydroxylethylguar hydroxypropyl guar, a carboxymethylhydroxyethyl guar, a carboxymethylhydroxypropylguar, an alkylcarboxyalkyl cellulose, an alkyl cellulose, an alkylhydroxyalkyl cellulose, a carboxyalkyl cellulose ether, a hydroxyethylcellulose, a carboxymethylhydroxyethyl cellulose, a carboxymethyl starch, a copolymer of 2-acrylamido-2methyl-propane sulfonic acid and acrylamide, a terpolymer of 2-acrylamido-2methyl-propane sulfonic acid, an acrylic acid, an acrylamide or a derivative of such compounds.

9. The fluid for treating the subterranean formation of claim 5, wherein the crosslinker-containing parylene-coated particle comprising the crosslinker possesses a chemical stability such that less than 5% mass deterioration or decomposition occurs when the crosslinker-containing parylene-coated particle comprising the crosslinker is exposed to downhole conditions.

10. A fluid for treating a subterranean formation comprising:
    a solvent; and
    a breaker-containing parylene-coated particle, wherein the particle comprises a breaker.

11. The fluid for treating the subterranean formation of claim 10, wherein an amount of parylene in the breaker-containing parylene-coated particle is in the range of from about 1% to about 40% by weight of the total weight of the breaker-containing parylene-coated particle.

12. The fluid for treating the subterranean formation of claim 10, wherein the breaker is an acid or a base.

* * * * *